Feb. 24, 1970     L. C. FOSTER     3,497,826
SCANNING LASER SYSTEMS AND COMPONENTS USEFUL THEREIN
Filed Jan. 11, 1967
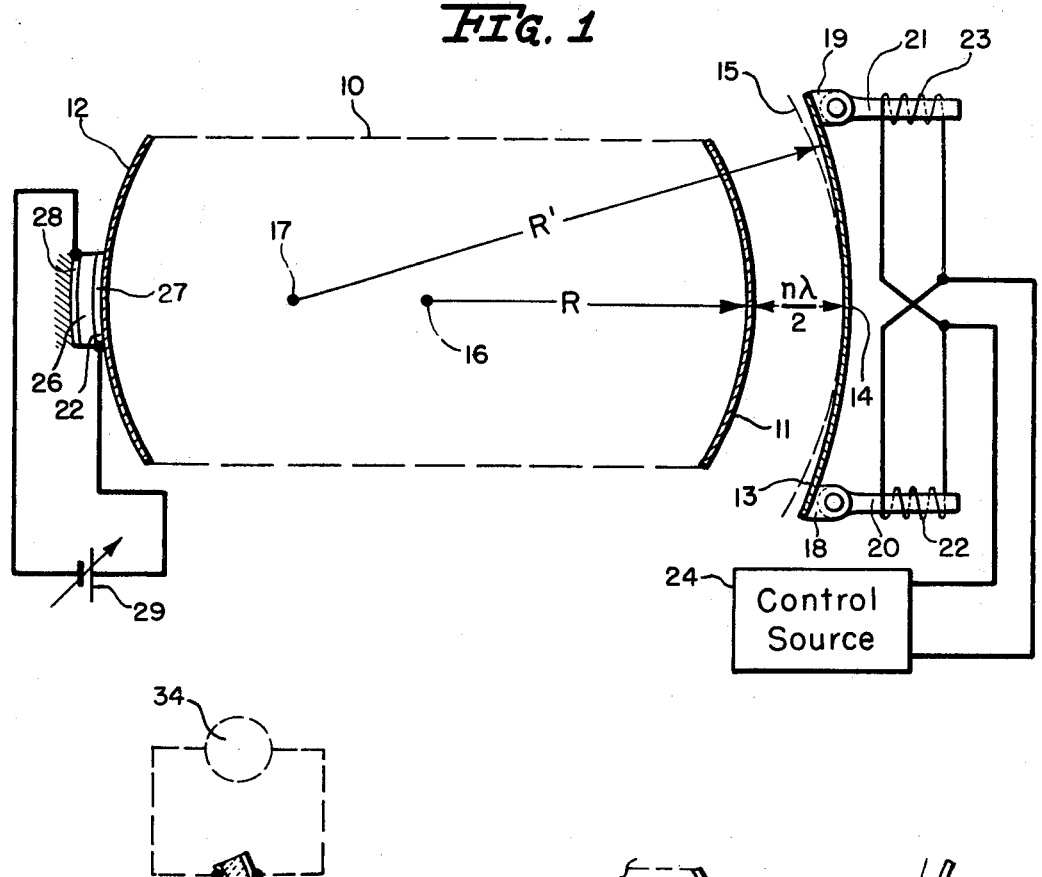
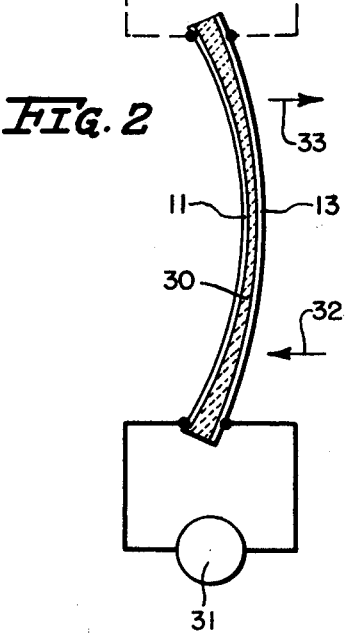
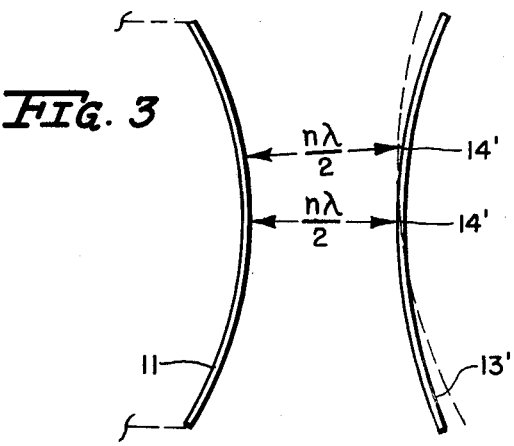
Inventor
Leigh Curtis Foster
By [signature] Attorney United States Patent Office
3,497,826
Patented Feb. 24, 1970

3,497,826
SCANNING LASER SYSTEMS AND COMPONENTS USEFUL THEREIN
Leigh Curtis Foster, Atherton, Calif., assignor to Zenith Radio Corporation, Chicago, Ill., a corporation of Delaware
Filed Jan. 11, 1967, Ser. No. 608,672
Int. Cl. H01s 3/12
U.S. Cl. 331—94.5                                      8 Claims

ABSTRACT OF THE DISCLOSURE

To achieve scanning of a laser beam, the exit reflector is of curved configuration and together with a second reflector of correlated curved configuration constitutes an interference filter in a localized region between the two where the optical spacing is such as to enable light transmission. The second reflector is rocked relative to the first so as to selectively move the localized light transmission region.

---

The present invention pertains to scanning laser systems and components useful therein. More particularly, the invention relates to systems in which a beam of light emerging from a laser is caused selectively to travel in different directions. As utilized herein, the term "light" refers to electromagnetic radiation in both the visible and invisible portions of the spectrum.

Since the advent of the laser, a number of systems have been proposed for controlling the travel of laser beams. Several such systems act upon the light beam after its emergence from the laser to deflect it selectively to different positions. Other approaches have involved the placement of an element within the laser itself to cause the light emerging from the laser to travel in different directions. These latter approaches have encountered certain difficulties either because of interference between the direction-determining mechanism and the laser action or by reason of the complexity of the necessary elements. In one such approach, the system includes polarizing elements of comparatively complex shape and manner of operation. Certain other arrangements permit only a small portion of the lasing material to be utilized for producing a beam in any one direction.

It is a general object of the present invention to provide a new and improved scanning laser system which avoids difficulties and disadvantages present in the aforementioned prior systems.

Another object of the present invention is to provide a new and improved scanning laser system which selectively controls the point of emission from the laser of its light beam.

A further object of the present invention is to provide a new and improved scanning laser system in which the scanning element forms part of the laser structure but yet is separated from the active lasing medium.

Still another object of the present invention is to provide a scanning laser system of the aforegoing character in which control of the light amplitude also is available.

A related object of the present invention is to provide a new and improved interference filter capable of transmitting a beam of light selectively through different areas of the filter.

A scanning laser system in accordance with the present invention includes a laser comprising a pair of reflectors defining an optical cavity which is resonant at a predetermined frequency for projecting a coherent light beam in a longitudinal direction. The exit reflector is convex with a predetermined center of curvature. A curved external reflector is disposed outside the cavity in registration with the convex exit reflector and has a center of curvature longitudinally displaced from the predetermined center of curvature. The longitudinal spacing between the convex exit reflector and the curved external reflector is an integral number of half-wavelengths at the laser frequency at only a single location. Means are provided for rocking the external reflector relative to the exit reflector to transversely displace the location at which the longitudinal spacing between the reflectors is integrally related to a half-wavelength at the operating frequency.

Related to the foregoing, the invention also resides in an interference filter having first and second reflectors arranged as described above and in cooperation with the aforementioned movement effecting means.

The features of the present invention which are believed to be novel are set forth with particularity in the appended claims. The organization and manner of operation of the invention, together with further objects and advantages thereof, may best be understood by reference to the following description taken in connection with the accompanying drawing, in the several figures of which like reference numerals identify like elements and in which:

FIGURE 1 is a schematic diagram of one embodiment of the scanning laser system;
FIGURE 2 is a schematic diagram of a modified form of elements utilized in FIGURE 1; and
FIGURE 3 is a schematic diagram of still another modification of those elements.

As illustrated in FIGURE 1, an optically resonant cavity 10 is defined by opposing reflectors 11 and 12 each in the form of a longitudinal section of a cylinder; as will be developed subsequently, FIGURE 1 also represents the preferred case where the reflectors are shown in cross-section and actually are in the form of sections of a sphere. The frequency of resonance of the cavity is determined in accordance with the relationship $L=n\lambda/2$ where L is the length of the cavity, $\lambda$ is the light wavelength and $n$ is an integer. Disposed within cavity 10 is a medium capable of lasing at the aforesaid resonant frequency in response to pumping excitation. Such a medium typically is a helium-neon gas which in itself is capable of lasing at several different frequencies in the visible and infrared ranges and which in operation lases at the particular one of those frequencies determined by the resonant frequency of the cavity and reflectivity characteristics of the mirrors. The pumping energy is applied by spaced electrodes along the length of the cavity and across which a high unidirectional potential is developed. As so far described, the laser is entirely conventional, including the use for mirrors 11 and 12 of multiple layers of dielectric material and its arrangement and operation rendering it capable of emission of beams or modes in different directions.

Spaced outside cavity 10 from reflector 11 at one end of the laser is a further reflector 13 of generally mating configuration but having a radius R' greater than the radius R of reflector 11. Reflector 13 likewise preferably is a multiple-layer dielectric mirror of a conventional nature, as such. There is only a single location at which reflector 13 is longitudinally to and spaced from reflector 11 by a distance equal to an integral multiple of half wavelengths at the frequency of the laser activity within cavity 10. Consequently, on a line between location 14 and reflector 11 reflector 11 and 13 together act as a Fabry-Perot interference filter portion highly transmissive of the light energy within cavity 10. As a result, a narrow beam of the light is permitted to exit from the system at location 14.

A more conventional interference filter is composed of two parallel mirrors which theoretically should have reflectivities of 100 percent and which in practice utilizing the mentioned multiple-layer dielectrics approach reflectivities of 99.9 percent. Light incident upon one of the reflectors is substantially reflected back by that reflector except when the one-way optical path length between the reflectors is one-half the wavelength of the light or an integral multiple thereof. Under this latter condition, the interference filter becomes highly transmissive of the incident light.

Within such an interference filter, light transmitted through the reflector upon which it is incident is reflected back and forth between the reflectors many times. The incoming light beam is of sufficient finite width relative to the filter thickness that there are a number of different light paths within the filter which are essentially superimposed or overlapping. It is the interference of the light among these multiple, parallel and essentially superimposed beams of light which is responsible for the wavelength-selecting properties of the interference filter. These basic principles of interference filter operation are well-known, having been described in such standard references as Light by R. W. Ditchburn, Interscience Publishers, New York City, 2nd Edition, 1963, pp. 121–129, 141–150, 152–154, and Introduction to Electricity and Optics, by Nathaniel H. Frank, McGraw-Hill Book Co., New York City, 2nd Edition, 1950, pp. 362–370.

If reflector 13 were to have a center of curvature the same as that of reflector 11, it would lie in the position indicated by dashed line 15. Consequently, whenever the optical spacing between an assumed mirror on line 15 and reflector 11 were an integral multiple of the light half-wavelength, the light from cavity 10 would be permitted to exit throughout the resulting interference filter. On the other hand, if the imaginary mirror on line 15 were optically spaced from deflector 11 by a different distance, the resulting interference filter would be essentially opaque to the light in cavity 10 so that no light would be permitted to emerge therefrom. Location 14 in reflector 13 also lies in this imaginary mirror on line 15; it defines a point (or line) of coincidence between the two.

In order to effect movement of location 14 between different positions in reflector 13, the latter is tilted or rocked so that the location where imaginary mirror 15 and reflector 13 are coincident moves about. That is, imaginary mirror 15 may be thought of as the wall of a first cylinder disposed inside a larger cylinder having a wall portion defined by reflector 13 and with the latter resting at a point or line on the former. By applying a force to an edge portion of reflector 13, the latter may be caused to rock so that location 14, the area of contact between the two wall portions, moves up and down along dashed line 15 in FIGURE 1.

Thus, the rocking motion of reflector 13, effectively on a surface defined by dashed line 15, causes the location of light emergence from reflector 13 to move up and down in the plane of the paper of FIGURE 1. With the two reflectors oriented perpendicularly to the plane of the paper, the emerging light beam is as wide, for the cylindrical-reflector case, as the reflectors have depth into the paper; of course, with such depth point 14 becomes a line perpendicular to the paper. For this cylindrical case, it will be observed that reflectors 11 and 13 have a curved configuration around respective axes of curvature directed into the plane of the paper at the respective centers of curvature 16 and 17. For the more general and preferred spherical-shaped case, an infinite number of different regions in each reflector are curved respectively about an infinite number of different axes of curvature all passing through a single point such as at 16 or 17. In that case, centers 16 and 17 simply are the spherical centers.

In the spherical-shaped case, location 14 may be similarly caused to move in any direction simply by tilting or rocking reflector 13 in that direction. In the usual case, as in displaying an image on a raster, it is desired to cause the laser beam to be scanned in two orthogonal directions, usually vertically and horizontally. Consequently, the rocking mechanism correspondingly causes reflector 13 to be rocked in both those directions. However, for simplicity of illustration hereinafter the description is limited for the most part to the case of rocking reflector 13 so as to cause scanning or movement of location 14 only in the vertical direction. Similarly, for ease of visualization the reflectors may be assumed to be merely cylindrical as actually shown in the drawing. It will be understood, however, that the same scanning control mechanism may be affixed along the horizontal axis so as to cause rocking of a spherical reflector in that horizontal direction in order to move location 14 in a direction into and out of the plane of the paper.

As a somewhat fundamental illustration of a mechanism for rocking reflector 13, a pair of lugs 18 and 19 project outwardly from vertically-opposite portions of the perimeter of the reflector and are pinned at one end to respective solenoid plungers 20 and 21 individually disposed within coils 22 and 23. A control source 24 supplies current to coils 22, 23 in push-pull so that, for a given polarity and amplitude of signal from source 24, the electromagnetic action of the coils moves plunger 20 in one director while plunger 21 is pulled in the other direction. Consequently, by evenly increasing the signal level fed to coils 22, 23, reflector 13 is caused to rock on imaginary surface 15 and cause light emergence location 14 to move or scan uniformly along reflector 13, in this case in the vertical direction. Alternatively, the signal level from source 24 may be changed in steps so as to cause step-by-step movement of point 14.

In television-type and other display systems, it also is often desirable to modulate the intensity of the light emerging from the laser. One manner of accomplishing this as illustrated in FIGURE 1 is to vary controllably the spacing between a pair of the reflectors. As one example, a transducer, composed of a piezoelectric element 26 sandwiched between electrodes 27 and 28 coupled across an adjustable potential source 29, is affixed to reflector 12. Electrode 28 is affixed to a stationary surface so that a variation in the potential from source 29 causes the thickness of the transducer to change. This change in turn alters the spacing between reflectors 11 and 12 by changing the position of the latter. In the vicinity of optical resonance, cavity 10 exhibits the typical peaked response curve. With the distance between reflectors 11 and 12 selected to correspond to the peak of that response curve, the intensity of the light is maximized. By very slightly changing the distance between the reflectors, the operating point on the response curve is moved from the peak and the light intensity correspondingly is reduced. Consequently, only a comparatively small movement of reflector 12 is necessary to cause a substantial variation in the intensity of the light emerging from location 14.

The interference filter defined by reflectors 11 and 13 likewise exhibits a transmission response curve having a peak with the response falling away to either side, defining the usual skirt portions that represent levels of transmission below the peak value. While this peak is comparatively narrow, a small variation of the filter spacing corresponds to movement of the operating point between different levels on one of the skirts. This in turn results in modulation of the amplitude of the light transmitted through the filter. Accordingly, the transducer shown affixed to reflector 12 instead preferably is affixed to reflector 13 so as to vary slightly the overall optical transmission path through the interference filter defined by reflectors 11 and 13. As a still further alternative, plungers 21 and 20 may be caused to move in unison by disposing a second set of coils individually on the plungers and driving those coils with an adjustable amplitude-control signal.

FIGURE 2 illustrates a generally more stable interference filter combination. For clarity, FIGURE 2 illustrates only the interference filter portion of the apparatus including reflectors 11 and 13, it being understood that reflector 11 may define one end reflector of cavity 10 as in FIGURE 1. In this case, a curved wedge of electrostrictive material 30, such as KD*T, ADP or KTN, is sandwiched between reflectors 11 and 13. The reflectors either are themselves conductive or a conductive coating covers the major opposing surfaces of either element 30 or of reflectors 11 and 13. A potential source 31 is connected across the conductive layers. In response to that potential, an electric field is created across the electrostrictive element which, in a manner well-known as such, causes the latter to expand or contract depending upon the polarization of element 30 relative to the polarity of the signal from source 31.

As illustrated, element 30 is polarized in a first direction indicated by arrow 32 over the lower half of the depicted generally cylindrical structure while it is polarized in the opposite direction as indicated by arrow 33 over the upper half. Consequently, when the polarity of the signal from source 31 is such as to cause constriction, or a decrease in width, of the lower portion of element 30, its upper portion at the same time is caused to expand or become thicker. Alternatively, the conductive coating may be split along the symmetrical center plane, perpendicular to the plane of the paper in FIGURE 2, so as in effect to provide two separately controllable sections of a uniformly polarized element 30. In this alternative, a second signal source 34 is coupled across the conductive elements of the upper section and source 31 is coupled only across the lower portion of the conductive elements. By supplying oppositely polarized potentials respectively from sources 31 and 34, the lower half of element 30 is caused, for example, to become thicker while the upper half is caused to become thinner by the electrostrictive action.

In any case, the oppositely directed electrostrictive action in the two different portions of element 30 cause the reflector 13 to be rocked relative to an imaginary surface parallel with reflector 11 so as to cause the point of transmission through the filter to move in the same manner as in FIGURE 1. When reflectors 11 and 13 are sections of a sphere as is preferred, similarly divided or reversely polarized segments of element 30 are aligned in the horizontal direction so as also to permit scanning in that direction.

As thus far described, reflector 13 has a curvature generally concentric with reflector 11 although of a greater radius; that is, reflector 11 is spaced from reflector 13 in the same direction as the center of curvature of the latter. In the different arrangement of FIGURE 3, reflector 11 is the same as before but reflector 13' has its center of curvature spaced from reflector 13 in the direction opposite the direction to reflector 11; that is, each reflector curves away from the other. In this case, the length of the radii may be the same. As before, however, there is only a single location at which reflector 13' is longitudinally spaced from reflector 11 by a distance equal to an integral number of half the light wavelengths and reflector 13' is caused, by electrostrictive, electromagnetic or other means, to rock in a manner such that location 14' is caused to move.

Visualizing reflector 13' as the rocker of a rocking chair and reflector 11 as a cylinder wall uniformly coated with a layer $n\lambda/2$ thick, the action is as if the chair is rocking back and forth on the surface of that layer. The point or line of contact between the rocker and the surface on which it rocks continually reciprocates back and forth. In the same way, the rocking motion of reflector 13', as between the positions shown in full and in dashed lines, similarly causes a location spaced $n\lambda/2$ from reflector 11 to reciprocate back and forth in the vertical direction as shown in the drawing.

The apparatus disclosed includes an interference filter transmissive at only one location or narrow region and in which that location is selectively movable to different positions throughout the filter. With one of the interference filter reflectors also serving as part of the optically resonant cavity of a laser, the beam of light produced by the laser is selectively movable so as to emerge from the laser at any one of a number of different positions and correspondingly to travel in different directions. By at the same time modulating the intensity of the light, the system enables the reproduction of a television-type image.

While particular embodiments of the present invention have been shown and descvribed, it will be obvious to those skilled in the art that changes and modifications may be made without departing from the invention in its broader aspects. Accordingly, the aim in the appended claims is to cover all such changes and modifications as fall within the true spirit and scope of the invention.

I claim:
1. A scanning laser system comprising:
a laser including a pair of reflectors defining an optical cavity which is resonant at a predetermined frequency for projecting a coherent light beam in a longitudinal direction, one of the reflectors being convex with a predetermined center of curvature;
an external reflector disposed outside said cavity in registration with said one reflector and having a center of curvature longitudinally spaced from said predetermined center of curvature, the longitudinal spacing between said one reflector and said external reflector being an integral number of half-wavelengths at said frequency at only a single location;
and means for rocking said external reflector relative to said one reflector to transversely displace said location.

2. A system as defined in claim 1, in which said one reflector and said external reflector are each of spherical configuration.

3. A system as defined in claim 1, which further includes means for selectively varying the intensity of said coherent light beam.

4. A system as defined in claim 3, in which said means for varying the intensity of said coherent light beam comprises means for varying the spacing between the pair of reflectors which define said optical cavity.

5. A system as defined in claim 1, in which said external reflector is of a configuration similar to that of said one reflector but with a larger radius of curvature.

6. An interference filter comprising:
a pair of non-uniformly spaced reflectors separated by a light-transmitting medium;
and means for rocking one of said reflectors with respect to the other to vary the transverse location where the spacing therebetween is an integral number of half-wavelengths of light of a predetermined frequency.

7. An interference filter as defined in claim 6, in which said means for rocking one of said reflectors relative to the other includes an electrostrictive element sandwiched between said first and second reflectors.

8. An interference filter as defined in claim 6, in which said means for rocking one of said reflectors relative to the other includes an electromagnetic actuator coupled to one of said reflectors.

References Cited

UNITED STATES PATENTS 3,344,365   9/1967   Lewis                  331—94.5
3,395,365   7/1968   Fork                   331—94.5

RONALD L. WIBERT, Primary Examiner

P. K. GODWIN, JR., Assistant Examiner

U.S. Cl. X.R.

350—1.60, 6; 356—106, 112